(12) United States Patent
Maijala et al.

(10) Patent No.: US 10,943,206 B2
(45) Date of Patent: Mar. 9, 2021

(54) SYSTEM AND METHOD FOR TRACKING PRODUCTS IN OPEN-LOOP SUPPLY OR VALUE CHAIN

(71) Applicant: Stora Enso OYJ, Helsinki (FI)

(72) Inventors: Juha Maijala, Espoo (FI); Petri Sirvio, Imatra (FI)

(73) Assignee: Stora Enso OYJ, Helsinki (FI)

( * ) Notice: Subject to any disclaimer, the term of this patent is extended or adjusted under 35 U.S.C. 154(b) by 298 days.

(21) Appl. No.: 15/766,439

(22) PCT Filed: Oct. 5, 2016

(86) PCT No.: PCT/IB2016/055948
§ 371 (c)(1),
(2) Date: Apr. 6, 2018

(87) PCT Pub. No.: WO2017/060824
PCT Pub. Date: Apr. 13, 2017

(65) Prior Publication Data
US 2018/0211207 A1 Jul. 26, 2018

(30) Foreign Application Priority Data
Oct. 8, 2015 (SE) .................................... 1551299-9

(51) Int. Cl.
*G06Q 10/08* (2012.01)
*G06K 19/07* (2006.01)

(52) U.S. Cl.
CPC ....... *G06Q 10/087* (2013.01); *G06K 19/0723* (2013.01); *G06Q 10/0833* (2013.01)

(58) Field of Classification Search
CPC .......... G06Q 10/00; B42D 15/00; H04Q 5/22; B60C 11/24; B60C 19/00; B60C 23/00; B60C 23/02
(Continued)

(56) References Cited

U.S. PATENT DOCUMENTS 6,563,417 B1 * 5/2003 Shaw .................. G06K 7/0008
340/10.1
7,513,425 B2   4/2009 Chung
(Continued)

FOREIGN PATENT DOCUMENTS

JP   2000035994 A    2/2000
JP   2010283850 A   12/2010
(Continued)

OTHER PUBLICATIONS

International Search Report for PCT/IB2016/055948, dated Dec. 19, 2016.
(Continued)

*Primary Examiner* — Olusegun Goyea
(74) *Attorney, Agent, or Firm* — Greer, Burns & Crain, Ltd.

(57) ABSTRACT

A system for monitoring the life cycle of a product even in open-loop retail environment having regard to the associated supply or value chain, comprising tag provision equipment arranged to obtain product information and to configure a wirelessly interrogatable electronic identification tag provided with externally readable identification information to a product item, wherein configuring incorporates at least partially automated determination, according to predefined decision logic, of at least one technical characteristic of tag implementation based on the product information to optimize the operation of the tag, and electronic data management system accessible via a communications network, preferably the Internet, comprising a data interface configured to receive and transmit data, and a data repository configured to store indications of received digital notifications of tag reading events in a plurality of activities of the associated supply or value chain, said notifications convey-
(Continued)

ing said tag identification information. A corresponding method for execution by the system is presented.

20 Claims, 3 Drawing Sheets

(58) Field of Classification Search
USPC .......... 235/451, 384, 385; 705/28; 340/10.1, 340/443, 449, 445, 572.1
See application file for complete search history.

(56) References Cited

U.S. PATENT DOCUMENTS

| | | | |
|---|---|---|---|
| 7,603,296 B2* | 10/2009 | Whiteley | G06Q 10/087 705/28 |
| 7,614,555 B2* | 11/2009 | Sullivan | G06K 7/0008 235/451 |
| 7,657,468 B1* | 2/2010 | Whiteley | G06Q 10/06 705/28 |
| 7,664,685 B1* | 2/2010 | Whiteley | G06Q 10/063 705/28 |
| 7,667,572 B2 | 2/2010 | Husak et al. | |
| 7,707,076 B1* | 4/2010 | Whiteley | G06Q 10/06 705/28 |
| 2001/0004236 A1* | 6/2001 | Letkomiller | B60C 23/20 340/572.1 |
| 2003/0132854 A1* | 7/2003 | Swan | G06Q 10/087 340/8.1 |
| 2003/0173403 A1* | 9/2003 | Vogler | G07C 9/28 235/385 |
| 2004/0008112 A1* | 1/2004 | Carrender | G05D 23/24 340/539.26 |
| 2004/0130442 A1* | 7/2004 | Breed | G02B 27/01 340/443 |
| 2004/0143505 A1 | 7/2004 | Kovach | |
| 2005/0055287 A1* | 3/2005 | Schmidtberg | G06Q 10/0833 705/28 |
| 2005/0192727 A1* | 9/2005 | Shostak | B60C 23/041 701/37 |
| 2005/0236479 A1* | 10/2005 | Schmidtberg | G06Q 10/08 235/384 |
| 2006/0049946 A1 | 3/2006 | Sullivan et al. | |
| 2008/0290995 A1* | 11/2008 | Bruns | G06K 7/0008 340/10.1 |
| 2009/0037240 A1* | 2/2009 | Schmidt | G06Q 10/00 705/7.39 |
| 2010/0090804 A1 | 4/2010 | Gruber et al. | |
| 2011/0304131 A1* | 12/2011 | Zhou | G09F 3/0297 283/74 |

FOREIGN PATENT DOCUMENTS

| | | |
|---|---|---|
| RU | 71791 U1 | 3/2008 |
| WO | 2002021424 | 3/2002 |

OTHER PUBLICATIONS

Hodges, Steve; Thome, Alan; Mallinson, Hugo; and Floerkemeier, Christian; "Assessing and Optimizing the Range of UHF RFID to Enable Real-World Pervasive Computing Applications;" Pervasive Computing; 2007, vol. 4480. Springer, Berlin, Heidelberg.

* cited by examiner

SYSTEM AND METHOD FOR TRACKING PRODUCTS IN OPEN-LOOP SUPPLY OR VALUE CHAIN

CROSS-REFERENCE TO RELATED APPLICATIONS

This application is a U.S. National Stage under 35 U.S.C. § 371 of International Application No. PCT/IB2016/055948, filed Oct. 5, 2016, which claims priority to Swedish Patent Application No. 1551299-9, filed Oct. 8, 2015.

FIELD OF THE INVENTION

Generally the present invention relates to remote tracking of products and related analysis. Especially, however not exclusively, the present invention concerns tracking the status of product items having regard to the associated supply or value chain and provision of related analysis through the utilization of wirelessly readable tags provided with the product items.

BACKGROUND

A product may be tracked by a variety of different technological means. Traceability across the supply and value chains may provide valuable insight into the overall management of these both chains and generally the life-cycle of the product including design, manufacturing, logistics, storage, marketing, sales, brand management, etc.

In particular, supply chain management (SCM) refers to the management of the flow of goods and services including movement and storage of raw materials, work-in-process inventory, and finished goods from a point of origin to a point of consumption at an end customer. Obviously, effective SCM incorporating various design, planning, and control activities, benefits from proper monitoring of different supply chain activities so that the optimization of the chain segments can be jointly and timely executed based on real-life data.

In turn, value chain management (VCM) especially refers to the optimization of activities that create value by producing goods or services from raw materials for purchase by a consumer, including e.g. packaging, marketing and naturally provision of different desired properties to a product by applicable operations, which may include e.g. versatile processing of materials that make up the end product to render it valuable in the eyes of the customer.

A physical, tangible product itself, related product package or e.g. a pallet may be provided with an electronic tracking device such as an active radio beacon or GPS (Global Positioning System) based transponder that sends a wireless signal, such as a cellular signal, indicative of the location of the device. The sent signal may contain explicit position data established from sensor data or captured external positioning signal such as the GPS signal. Such electronics-heavy tracking solutions are ultimately relatively complex, costly and associated with a multitude of risks arising from e.g. limited coverage of required wireless signals, power consumption/supply challenges, general fragility of used electronic components, weight, size, etc. Therefore, this kind of a sophisticated and potentially duplicated tracking equipment suits mainly more valuable and larger target elements such as containers or vehicles while consumer goods and other items of typically smaller dimensions, lesser weight and possibly cost would benefit from a generally more streamlined alternative.

Indeed, more compact, simpler, lighter and more affordable product tracking implementation may be achieved with the use of contactless tags such as RFID (Radio Frequency Identification) tags or other wireless tags that can be embodied e.g. as sticker labels attached onto the surface of a host item, which may refer to a surface of the target product itself or e.g. associated product package. Contactless tags are often harnessed to employ electromagnetic field for wireless data transfer with an external scanner device called a reader. The tags may store identification (ID) information they are capable of exhibiting to the reader when the reader interrogates the tag for identification purposes. Supplementary data may be transferred along with the ID information.

However, even with contemporary RFID based solutions there still remains some room for improvement in terms of comprehensive value and supply chain monitoring having regard to product tracking for the associated management and optimization purposes. Especially open-loop retail environments continue having considerable difficulties in adopting e.g. RFID based systems as the related retailers have different vendors and product suppliers, whereupon control over the complete supply or value chain being thus dispersed among those multiple entities. Acquisition of product data would in many cases turn out crucial from the standpoint of sustainable SCM and VCM, but as the used tracking technologies may vary from a entity to another even in the same chain or perhaps lack completely, data flow over the concerned chain is at least partially uncontrolled and incomplete when considered as a whole.

In current solutions, the tracking system providers (software providers) need to install and configure a desired tag reader infrastructure with associated tailored software and possible back-end connections separately to each different location where tag data is to be read, processed, modified or written. The installed systems may mutually vary and be at least partially incompatible. The big picture is easily lost as to the SCM/VCM when the tracking activities are fragmented between different contract packers, manufacturing houses, printing houses, tag providers, wholesalers, etc. A huge opportunity for versatile supply/value chain analysis and optimization is lost as outcome.

Further, many tag-based solutions rely on closed-loop environment, i.e. the end products supplied to the customers are ultimately returned and e.g. refurbished or remanufactured, whereupon different data stored therein may be recovered for utilization. A read-write tag may be thus applied, besides providing identification information from an included microchip to a reader via an antenna, to carry additional information written thereto dynamically during the journey through the supply/value chain to enable later investigation of the product history.

Particularly in large scale processes, writing operations involving the tags are, however, problematic as they add to the latency of the product flow and complexity of the required system. Therefore, it is impractical to implement pricey, complex and power hungry rapidly (re-)writable memory with the tags either.

Yet one often related problem arises from the design and installation of the tags themselves. Tags such as radio frequency tags are typically mass-manufactured/bulk items that are directly produced onto the end product or packaging thereof, or attached thereto in the format of a separate label with a securing adhesive. Their configuration, considering e.g. size, shape, used technology (supported interrogation method and related parameters), alignment/positioning, and included components/materials, is of generally recognized type, which is practically never optimized to any particular use case or use scenario involving a certain type of host item, which may refer to a solid product, fluid in an impermeable contained such as a plastic or glass bottle, product packaging made of e.g. cardboard, etc. Various properties such as electrical conductivity of the host item may therefore vary considerably, and variance may occur even within a single item that may be of heterogeneous construction.

This leads to situations wherein generic tags perform lousily, sometimes basically unacceptably, in terms of remote readability and e.g. durability or reliability. Either the product itself or the associated product package may reduce the reader signal coverage when product/package material is disposed between or possibly merely in the vicinity of the reader and the tag. On the other hand, in some environments during transportation, storage and e.g. sales the products may be subjected to conditions that impose additional stress and wear to the tag in terms of physical or chemical strain (impacts, rubbing, moisture, etc.), which may damage the tag or at least lower its performance considerably.

SUMMARY OF THE INVENTION

The objective is to alleviate one or more of the defects associated with contemporary tracking solutions in the context of value and supply chains of various products for analyzing, understanding and potentially optimizing their performance.

The objective may be achieved with the embodiments of a tracking system and related method in accordance with the present invention.

Accordingly, in one aspect a system for monitoring the life cycle of a product in open-loop retail environment having regard to the associated supply or value chain, the system optionally comprising a plurality of computer devices located in and dynamically allocated from a cloud computing environment, wherein the system comprises tag provision equipment arranged to obtain (receive e.g. via data interface or UI, derive based on received data, fetch from a local or remote data repository, read from a digital file, etc.) product information, where the product information indicates properties of a product item, and to configure a wirelessly interrogatable electronic identification tag to the product item for identifying the product item by externally readable identification information carried by the tag, wherein the externally readable identification information differs from the product information, and further wherein said configuring of the tag to the product item comprises:

determining, in automated fashion according to predefined decision logic, at least one adapted technical characteristic of the implementation of the tag, said implementation including properties, positioning and/or alignment of the tag, wherein the at least one characteristic is adapted based on the obtained product information to optimize the operation of the tag in connection with said product item, and producing or attaching the tag to the product item in accordance with the at least one adapted technical characteristic, and electronic data management system accessible via a communications network, preferably the Internet, comprising a data interface configured to receive and transmit data, and a data repository, optionally at least one database, configured to store indications of received digital notifications of tag reading events in a plurality of activities of the associated supply or value chain, said notifications conveying said tag identification information.

The system may further comprise identifier allocation equipment, such as a programmer device, or a 'chip writer', arranged to assign at least portion of said identification information to the tag, preferably a chip thereof, provided with sufficient memory capacity for the purpose. The tag is capable of exhibiting said identification information to a compatible reader. At least portion of the readable identification information is preferably unique or at least pseudo-unique. The allocation equipment or other entity such as the management system, being at least functionally connected thereto, may be configured to keep track of already-allocated identification information and/or to allocate new identification information so that duplicates are omitted among at least a predefined group of tags (thus at least resulting in pseudo-uniqueness of the tags). The identifier allocation equipment may optionally be integrated with the tag provision equipment.

In various embodiments, the system comprises one or more computer devices such as servers. The components, such as servers, of the system may be located in a cloud computing environment, optionally as physically distributed. The used components may be dynamically allocated therefrom. The cloud environment is preferably accessible via the Internet. Generally, the components may be connected via a communications connection or communications network such as the Internet and/or via private network(s), for instance.

In various embodiments, the product information may include at least one element selected from the group consisting of: product class or type, material(s) of the product, composition, chemical formula, ingredients, list of ingredients, size, dimensions, shape, shell-life, electrical properties of the product, product package information, product package size, package material, product package dimensions, product package shape, temperature, storage temperature, processing temperature, transport temperature, product package capacity, electrical properties of the package, tray information, blister pack information, mallet information, container information, wrapper information, and crate information.

Thus, in addition to or instead of data strictly regarding the actual payload or core component of the product, such as consumable beverage that is disposed in a bottle for transportation, protection and storage purposes, the product information may indeed describe the package/packaging of the core component or more generally, describe a means (if any) for storing, protecting, transporting and/or marketing the core component, e.g. the bottle or a can, tray, bag, box, pallet, blister pack and wrapper. Yet, associated conditions such as temperature may be taken into account. In some embodiments, naturally such means is not used/needed or they are basically integral part of the product item (e.g. a casing of an electronic device, such as flashlight, that may also define at least part of the body of the product item), whereas in some embodiments even multiple such means may be simultaneously or sequentially (changed during the value/supply chain) applied. For example, beverage in a bottle may be further located with other beverage-filled bottles in a common tray. Each means, such as each of the bottles and the tray, may contain at least one dedicated tag of its own or a shared tag may be used e.g. as physically attached or produced to the tray.

The product information may be obtained (digitally read, for instance) from a digital data carrier such as a computer-readable file or retrieved from a database hosting such information, for example. The carrier, e.g. the file, may be a design or other type of file describing product information such as package information and/or package content (actual product) information. The file may have been provided by a design company, for example. The information may be transferred as a transitory signal over a communications carrier such as communications network (e.g. the Internet). Alternatively, the information may be transferred or stored using a non-transitory carrier such as hard disc, memory card, optical disc, etc. The applicable file formats include e.g. a desired CAD (computer-aided design) file format or e.g. widely spread PDF (Portable Document Format)™.

The product information may indeed be established, edited, hosted, utilized and/or provided/distributed by a product manufacturer, package manufacturer, (product/package) design company, contract packer, and/or other member of the supply or value chain, for instance. Alternatively or additionally, a number of external entities and systems may case-specifically provide product information facilitating the design of the tag.

In some embodiments, the product information may be read from a product item or especially, product package that is already available and potentially lacks just the tag, or at least portion thereof (such as antenna) to be provided e.g. via adhesive label, thereon. The product information may be read optically or electromagnetically. It may have been provided e.g. as text or a barcode, or other graphical code, on the package.

In various embodiments, the technical characteristic of the tag implementation responsive to the product information may include an element selected from the group consisting of: size, shape, dimensions, location, position, alignment, type, RF technology used, RF frequency, antenna, antenna type (e.g. monopole, dipole, folded dipole, inverted-F, fractal, fractal loop, text, meandered (line), fractal dipole, patch (many of these type definitions may in practice overlap and thus be implemented by the same antenna structure)), antenna shape, antenna size, antenna position relative to the tag or product item, number of antennas, production technique, transmission power, receiver sensitivity, circuit design, integrated circuit (e.g. microchip) design, material(s), casing, label, substrate, number of layers, printing material (e.g. ink), printing material properties, printing material thickness, protective material, electrical conductivity, capacitance, inductance, resistance, optical transparency, and design of a product package accommodating the product and the tag, design of a label or other substrate accommodating the tag.

Preferably the management system is accessible via the Internet using e.g. IP protocol (Internet protocol). The data interface may incorporate a number of interfaces that support mutually different communication standards, techniques and/or technologies, wired and/or wireless. Tag reading equipment that is typically remote from the management system, which is, in turn, often at least functionally considered as a centralized entity, may thus provide data such as indications of tag reading events and related data to the management system via the interface. Users of the gathered data and/or determined analysis results may include e.g. systems, such as merchandise availability, management or other systems of various value chain members, or 'operators', or their vendors, or even consumer users. These parties may access the data received or produced by the system e.g. via a web interface that is optionally accessed using web browser software. The gathered and analyzed data may be output based on e.g. a predefined schedule, a received data request, or upon fulfillment of some other predefined trigger condition. The data transfer may be of push or pull type, for instance.

For data processing, the system preferably comprises a number of processing units such as microprocessors and/or signal processors. The data repository may include memory space besides for accommodating the indications and possible other received tag or product related data, also for hosting e.g. program instructions controlling the processing units in accordance with the present invention.

In view of the foregoing, the system is preferably configured to subject at least part of the received data to analysis. Predefined aggregate analysis such as big data analytics potentially covering data mining, predictive analytics, statistical analysis, etc. may be executed to provide detailed information, such as performance indicators, about various members and/or activities of the supply or value chain to the interested parties such as supply/value chain members (manufacturers, logistics companies, retailers, even end customers/users), which enables optimizing one's performance. Alternatively or additionally, data received from the reading equipment at various locations may be indicated as such to a number of members of the supply/value chain and/or possible other parties and systems. Still as a further alternative or additional measure, the management system may be configured to determine a number of performance-optimizing control actions relating to one or more activities in the associated value/supply chain based on the analysis results. The control actions, or in practice related control parameters with optimized values, may be embodied as human-readable digital messages or instructions (e.g. via e-mail, via UI of the system, etc.) to the target entity, or as control command type messages that trigger the receiving system to execute responsive, e.g. corrective, actions preferably automatically.

Additionally or alternatively, the received data may be subjected to common (big data) analysis also across a plurality of supply or value chains. For instance, the analysis results may describe performance or other characteristics of several supply/value chains that are, for their part, associated with different products (product items and/or product classes), product manufacturers, retailers, vendors, labels/brands, logistics companies, consumers/users, packers, and/or system providers, for example.

Accordingly, when a vast amount of versatile data becomes available for joint analysis by a common system due to the data gathering and storage aspects of the present invention, a number of business information and technical information items may be revealed to facilitate making reasoned business decisions. Trends may be recognized, hidden or unknown patterns or correlations detected, customer preferences figured out (e.g. based on explicit user feedback and/or by monitoring buying behavior), parallel supply or value chains compared in terms of desired parameters, etc., which may in turn be harnessed in optimizing the performance of a supply or value chain operation by appropriate business decision and e.g. the aforesaid control actions. For example, product marketing may be enhanced (re-directed, increased, reduced), new or promising business opportunities such as market segments identified, customer service improved, manufacturing, logistics or storage operations made for effective, etc.

Generally, a number of existing product value or supply chains may be analyzed answering key questions such as what the supplied products actually are, what are the associated segments (e.g. product segment, customer/user segment, etc.), what is their geographical extent (supply/value chain locations such as manufacturing, packing and/or stopping location(s), route(s)), which are the market areas (continents, countries, regions, cities, districts, etc.), what are the corresponding customers/users like in terms of customer profiles or generally characteristics, what are the shipment schedules (dispatch, arrival, transport and/or storage times, sales period) at different entities/locations, which are the used batch sizes, etc.

Yet, the consumers of the analysis data (e.g. supply/value chain members) may be analyzed as well having regard to a variety of different parameters, e.g. location, class or e.g. role in the supply/value chain, utilization frequency, utilization volume, size, industry segment, etc.

The conducted analysis may optionally include at least one element selected from the group consisting of: association rule learning, classification tree analysis, genetic algorithm, machine learning, regression analysis, sentiment analysis, and social network analysis.

In various embodiments, the system may further comprise tag reading equipment at one or more locations that may be remote to the electronic data management system, corresponding to one or more activities of the supply or value chain of the tracked product. The reading equipment may be configured to interrogate a tag for at least said identification information and transmit, via its communication interface, a notification comprising an indication of the identification information to the electronic data management system for logging and analysis, for example. The tag reading equipment may be configured to transmit one indication referring to tag reading event at a time, optionally substantially in real-time fashion, or in batches optionally according to a schedule or timed otherwise. In case of passive tags, the reading equipment is typically configured to power the tag via electromagnetic coupling through the antennae of the concerned communicating elements.

Preferably, the tag reading equipment is further configured to transmit location data, time/date data, activity data and/or sender identification information to the management system with the notifications. The activity data may indicate or describe the activity in connection of which (prior to, during, or after which) the tag was read, such as product manufacturing, packing, storage, logistics, or sales activity. The obtained data may be, optionally selectively, included in the repository. For example, a log may be maintained indicative of activities relating to the tag/product item associated with the tag.

Physically the tag reading equipment may comprise a reader device that is at least functionally connected to a communication device, such as a server or network-connected computer, capable of transmitting the desired data to the management system. The reading equipment may thus comprise multiple at least functionally connected elements/devices.

In various embodiments, the tag may include a radio frequency (RF, e.g. on LF, HF, UHF, or SHF spectrum) tag such as RFID or NFC (Near-field Communication)—compliant tag. Preferably, the utilized tag is a so-called read-only or WORM (Write Once, Read Many) type tag. The tag may thus, in some embodiments, only enable reading the data it contains after the initial write, while (re-)writing data thereon is not possible. Advantageously, at least or solely the identification information can be read from the tag. By omitting more complex, time-consuming and error-sensitive write activities since the initial write (which may take place during the manufacturing of the tag or afterwards, e.g. upon installation at the product item, comprising the writing of at least identification information), the subsequent tag interactions can be kept as swift, reliable and simple reading actions at the tag reading equipment. During the initial write, the allocated identification information may be stored among other potential information in the memory of the tag.

Generally a tag comprises a processing unit and memory e.g. as a microchip/integrated circuit, and an antenna with desired transmitter/receiver features. It may be active (self-powered e.g. by a battery), passive (powered by the reader via the antenna) or semi-passive (internally powered circuitry but communication to reader by power received therefrom). Passive or semi-passive embodiments are generally preferred for simplicity, reduced cost and small size/weight over the active ones.

In some embodiments, the tag provision equipment comprises gear for installing a tag, which may have been provided or established on a suitable carrier (e.g. a plastic film, label, multi-layer laminate, sticker, or any combination of two or more aforesaid elements) to the target product item by adhesive, for instance. E.g. a label or other substrate carrying a printed, mounted and/or otherwise established tag components (typically at least chip and antenna) may be manufactured first and then attached to the product item by applicable means such as adhesive, pressure, heat, molding, etc.

Alternatively or additionally, the tag provision equipment may comprise gear for at least partially producing (manufacturing) the tag optionally directly to the product item by printing, for example.

Encoding, which refer to writing the initial data such as identification information to be subsequently read by the readers, may take place upon manufacturing or after installation by applicable encoding equipment, which may be integral with a tag printer or other provision gear.

Physically, the tag provision equipment may generally contain one or more, at least functionally connected, devices. It may, for example, contain separate or integral tag implementation design (product information—based) and attachment, optionally also manufacturing, devices.

In another aspect, a method for tracking products having regard to the associated supply or value chain, comprising
  obtaining product information, by tag provision equipment, where the product information indicates properties of a product item, and configuring by the tag provision equipment, a wirelessly interrogatable electronic tag to the product item for identifying the product item by externally readable identification information carried by the tag, wherein the externally readable identification information differs from the product information, and further wherein said configuring of the tag to the product item comprises:
  determining, in automated fashion according to predefined decision logic, at least one adapted technical characteristic of the implementation of the tag, said implementation including properties, positioning and/or alignment of the tag, wherein the at least one characteristic is adapted based on the obtained product information to optimize the operation of the tag in connection with said product item, and
  producing or attaching the tag to the product item in accordance with said at least one adapted technical characteristic, and
  storing, at an electronic data management system accessible via a communications network, indications of digital notifications of tag reading events in a plurality of activities of the associated supply or value chain, said notifications indicating said tag identification information.

The method may further comprise assigning at least portion of said identification information the tag by an applicable writing, or 'programming', procedure.

In some embodiments, the method further comprises associating, at the electronic data management system, tag identification information with corresponding product (or product packaging) information including the indications of digital notifications reflecting tag reading events.

In preferred embodiments, the tag or at least the identification data thereof is associated with product information at an early phase relative to supply or value chain. This may take place upon configuration of the tag in the product item, when the product information has become available regarding the product item as a whole or at least part thereof, e.g. packaging, and an applicable tag to be installed or produced to the product item has been determined. The association is advantageously without delay stored in the management system (preferably in the data repository of the management system) and cultivated by the received notifications so that a product history related event log is established and subsequently updated, for instance. The management system may indeed be configured to store, in the repository, product information of a product item as generally contemplated herein, identification data of the tag provided to the product item and indications of the notifications received based on tag reading events. Early association or 'linkage' is advantageous because it enables tracking the product item and gathering/logging and optionally analyzing the obtained data substantially from the very beginning of the value/supply chain, whereupon the obtained data is complete for analysis.

Different considerations presented herein regarding the embodiments of the system may be flexibly applied to the embodiments of the method mutatis mutandis and vice versa, as being appreciated by a skilled person.

The utility of the present invention arises from a plurality of issues depending on each particular embodiment. The solution makes generally easier for different entities over the value chain to adopt contactless tags such as RFID tags, facilitate the use of cost efficient tags and related equipment, decrease the complexity of reader infrastructure and related implementation, provide item level tagging within the open-loop retail environments and control the data flow over the supply or value chain.

In more detail, the tag implementation comprising the tag and e.g. positioning and alignment thereof may be technically optimized and tailored having regard to various constructional, material and functional features of each product in question. As a result, the functionality of the tag may easily outrun the performance offered by general, multi-purpose tags that are commonly available what comes to the achieved range, reliability, durability, weight (typically minimized), optical properties (optically substantially transparent tag, a graphic/textured tag or otherwise a tag with predefined appearance may be desired), power consumption, damp-resistance, shock resistance, etc.

Secondly, as the tag ID is preferably linked with the product information at very early phase of the supply/value chain, the obtained information arising from tag reading events is complete and enables thorough analysis of various details of the chain in terms of related performance figures. In various embodiments, the management system gathering data from different tags associated with products may be implemented as a back-end system that provides besides e.g. a log of reading events taken place relative to the product tags on their journey through the value/supply chain also analysis based on subjecting the gathered reading event and/or related data to processing such as statistical processing outputting desired technical and/or financial figures characterizing the status of logistics, marketing, sales, production, design and/or potential other activities making up the value/supply chain.

For example, production. logistic, distribution or sales bottlenecks may be detected, loss localized, turnaround times calculated, sale, returns and trends quantified, etc. Accordingly, the value or supply chain activities and operators may improve their operation so that the chain works optimally as a whole from the beginning to the end. In a nutshell, easy to implement, cost-efficient but comprehensive solution for product tracking is provided. Gathered data may be made subject to a fee, whereupon its collection and analysis may be made financially worthwhile from a standpoint of a third party operator, for example.

In some embodiments, the management system may implement, incorporate or be at least functionally connected with a merchandise availability service or system that may be utilized for tracking tagged products for improving their availability, keeping track of the inventory, optimizing the replenishment cycle, preventing out-of-stock situations and/or elevating related security as the tags may also be applied for theft prevention. For example, tag readers or other corresponding devices, optionally embodied as gates, may stimulate or interrogate the tags e.g. at a shop exit so that a detected presence of a tag in the near-by product within reading range may be configured to trigger an audible, visual or other type of alarm/action.

Further, it is noteworthy that the suggested solution works well also in open-loop ecosystems and without data provision or analysis delay that is typically associated with closed-loop arrangements heavily exploiting and possibly solely relying on (re-)writeability of the used tags, because the tags applied in connection with various embodiments of the present invention do not have to dynamically store new data written thereto while proceeding through the chain. Instead, the tag reading events are preferably reported substantially without delay to the management system over a communications network with supplementary information identifying e.g. the reading time, location, reader/sender identity and various other possible details (e.g. the chain phase or operation during which the reading event took place). Nevertheless, the present invention is still naturally applicable in closed-loop environments.

Other advantageous features of different embodiments will become clear to a skilled reader based on the detailed description below.

The expression "a number of" may herein refer to any positive integer starting from one (1).

The expression "a plurality of" may refer to any positive integer starting from two (2), respectively.

The terms "a" and "an" do not denote a limitation of quantity, but denote the presence of at least one of the referenced item.

The term "product item" may generally refer herein to any concrete durable product or consumable product, related packaging or package, container, tray, mallet, can/bottle, or other means of transportation, protection, storage, marketing or sales, provided with or forming an integral or removable part of the product. The term may also refer to aggregate element, such as a blister pack or mallet, potentially accommodating a plurality of mutually similar or different product units such as pills.

BRIEF DESCRIPTION OF THE DRAWINGS

Next the present invention will be described in greater detail with reference to the accompanying drawings, in which.

DETAILED DESCRIPTION

Figure 1:
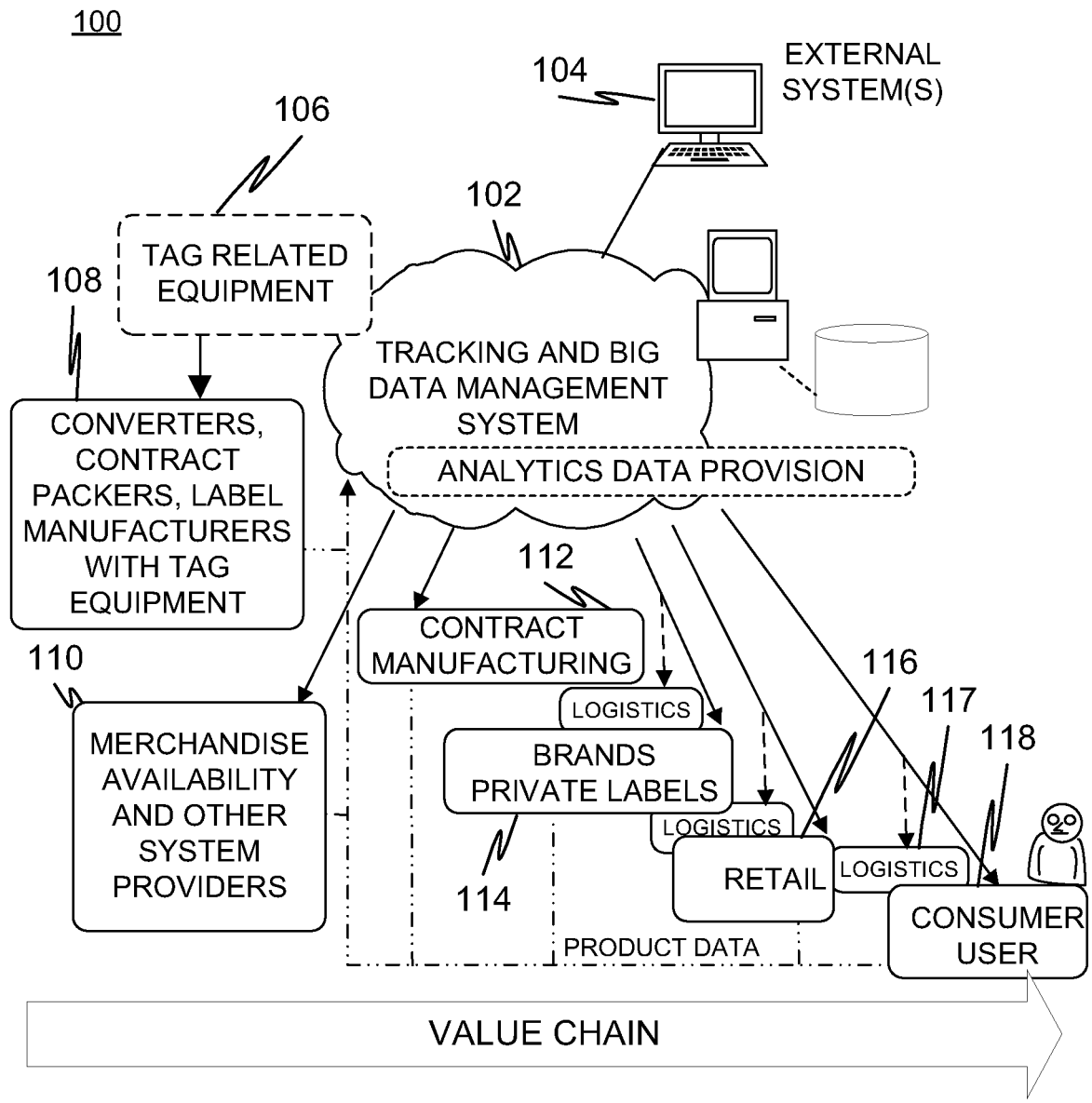
FIG. 1 illustrates one use scenario and applicable embodiment of the present invention with various members and aspects of the associated supply/value chain.

FIG. 1 provides, at 100, one viewpoint to a system in accordance with an embodiment of the present invention and a related use scenario involving several entities of the supply/value chain of a product to be tagged and tracked accordingly.

Tag related equipment 106 such as tag reading equipment, ready-made tags and/or tag manufacturing equipment (e.g. printing equipment), and communication equipment for signalling notifications of tag reading events and supplementary information (e.g. the time/date of a reading event, location, and identification data read from the tag) is provided to a number of desired entities 108 through the supply/value chain in various segments thereof. For example, selected converters, contract packers, manufacturing houses, printing houses, tag manufacturers, logistic companies, distributors, retailers, users/end-customers, and/or end-of-life businesses may be equipped with such gear.

Data management system 102 collects product data provided by a number of entities along the value/supply chain of a product and stores it (optionally selectively) in a data repository such as one or more databases. At least part of the data received is sent by the entities responsive to tag reading events by tag reading equipment which may be distributed along the chain to various steps during manufacturing, packing, logistics, storage, and sales phases thereof. The readers of the reading equipment contain or are at least functionally connected to a communications interface configured for the required data transfer, e.g., a communications network interface. The data may be transferred utilizing the Internet as data transfer medium between the reading equipment and the management system 102. Correspondingly, the system 102 comprises a communications interface and is preferably connected to the Internet for enabling widely available access thereto.

The system 102 may be configured to subject at least portion of the received data to analysis and derive, e.g., predefined statistics therefrom. The statistics may yield valuable information to supply/value chain operators and other parties desiring to optimize their activities having regard to the performance of the chain. For instance, merchandise availability system providers and/or other providers 110 may be offered the collected and/or derived data (analysis results) based on notifications of tag reading events and supplementary data. Still, contract manufacturers 112, private labels/brands 114, retailers 116, logistics consumers/end-users 118, etc. may be served.

The entities providing data based on tag reading events to the system 102 may be at least partially common with the entities receiving the analysis results and/or raw data collected by the system 102.

Forwarding the collected and/or analysed data to an interested party may be subject to fee and/or service in return type contract, such as provision of input data to the system 102 based on e.g. tag reading events.

Additionally or alternatively, the system 102 may contain control logic to provide control information to different parties, such as control systems of different value/supply chain members. The performance optimization may be thus be at least partially automated.

External system(s) 104 refer to devices that connect to the system 102 for data input or data access purposes via a compatible communications interface, which may include e.g. web-based or other graphical UIs in addition to or instead of mere data transfer interface.

Figure 2:
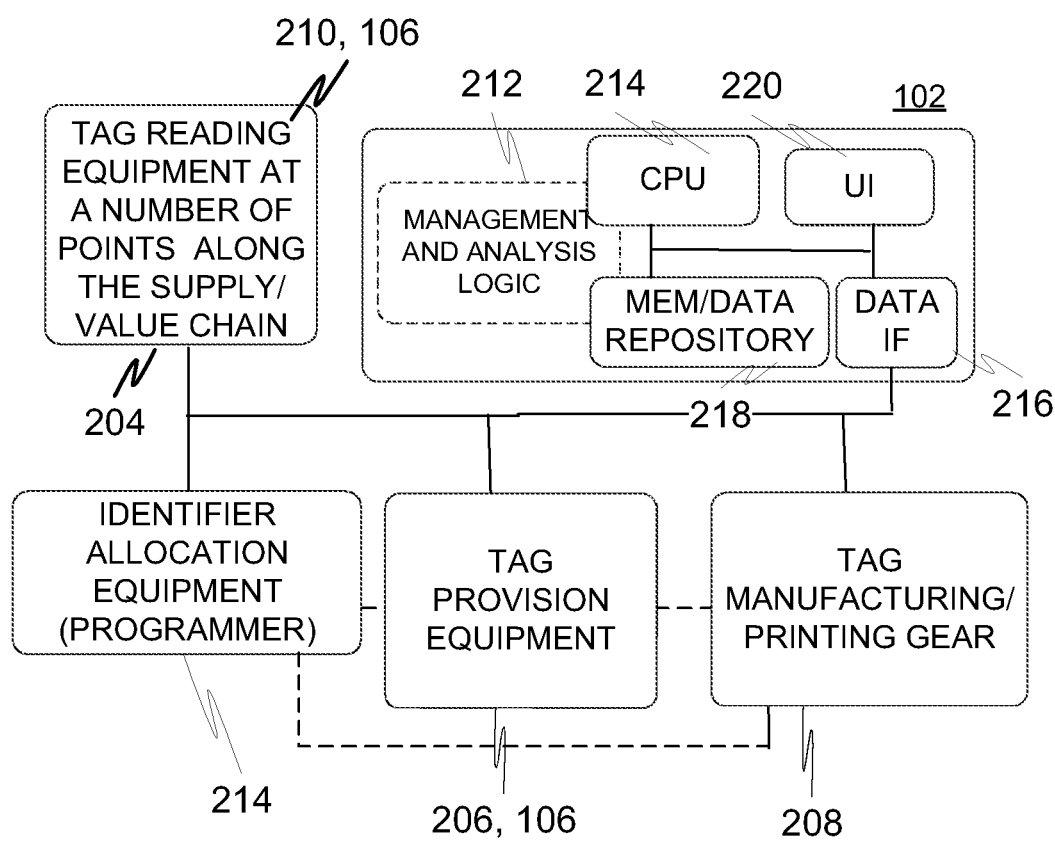
FIG. 2 is a block diagram of one embodiment of a system in accordance with the present invention.

FIG. 2 shows a block diagram 200 of one embodiment of a system in accordance with the present invention. Physically, various shown elements may reside distributed and likely are, in many embodiments, distributed with reference to e.g. management system 102, local tag reading equipment 210 at various segments of the concerned supply/value chain, and tag provision or manufacturing equipment 206, 208 as well as identifier allocation equipment 214. However, the elements remain at least functionally connected and thus establish the desired system for providing product tracking, data gathering, data distribution, and analytics platform in accordance with the present invention. A skilled person shall realize that the physical allocation and possible integration of various shown elements may be dynamically decided and optimized for each implementation, and the shown arrangement is only exemplary. In particular, broken connecting lines between elements 214, 206 and 208 have been provided in the figure to illustrate this fact.

Tag reading equipment 210, as a part of tag related equipment 106 supplied, comprises e.g. a number of tag readers that preferably wirelessly and contactlessly interrogate the product-related tags, which may have been integrated with or attached to products themselves and/or related packages, mallets, etc. as discussed hereinbefore. The reading equipment 210 may be configured to energize a passive or semi-passive tag so that it can identify itself and optionally provide further information to the reader. Energizing may be based on creation of electromagnetic field transmitted by the reader to power at least the transmitter of the tag. The readers may be configured as stand-alone devices or stand-alone reading instances in the associated premises, or provided in connection with other devices or process phases such as manufacturing, packing, logistics/distribution, storage or sales devices/phases of the supply/value chain.

Identifier allocation equipment 214 may refer to different programmer devices, for instance, that are configured to obtain/define and assign preferably at least pseudo-unique identification data to each tag to be tracked in connection with the associated product(s). Identification data may be established by the equipment 214 and/or an element at least functionally connected thereto, e.g. the system 102, based on predefined rules applying an available numeric or alphanumeric range for unique or pseudo-unique identifiers, for example.

In various embodiments, a tag typically includes a chip (integrated circuit) for providing memory capacity and limited processing/controlling capacity to the tag. The chip is then connected to an antenna that may be manufactured by means of printed electronics (e.g. ink-jetting, screen printing, gravure, etc.) or deposition, for instance, on a substrate. The substrate may contain or substantially consist of paper, cardboard, wood or other organic and/or fibrous material, fabric/textile material, plastic sheet or film (e.g. PMMA, PC or PET), glass, etc. The substrate containing the chip and antenna may be included in a multilayer stack type laminate, for example, which may include additional protective and/or adhesive layers. The tag may be attached to the target element, such as product package, by adhesive or other applicable means. Alternatively, the tag may be directly produced on the product, product package or e.g. mallet by suitable technique such as printing and then optionally covered by protective material layer(s).

A tag may be programmed at once or in multiple steps by one or more programmer devices, respectively, depending on the embodiment. One party that may execute the programming is a chip manufacturer whereas writes potentially occurring at later stages may be performed by e.g. a tag manufacturer/printing house, or even subsequent entities of the value/product chain provided that the tag is of read-write type. As mentioned hereinbefore, it is however beneficial in many embodiments to stick to read-only or WORM type tags to optimize read (interrogation) speed and operation simplicity among other advantages.

The readable identification information of a tag may include a serial number such as a TID (Tag ID), a product (e.g. type/class) code of the product item provided with the tag and/or an organization/company code (e.g. of product manufacturer), for instance.

In various embodiments, e.g. an electronic product code (EPC) may be included in the identification information hosted by the tag. The EPC number or other provided identification information can be subsequently used as a search term into a database holding tag identification data to advantageously uniquely identify the product item provided with the tag. The management system 102 preferably maintains such database.

Tag provision equipment 206, 106 may refer to e.g. tag installation or attachment equipment such as lamination or gluing apparatus. In addition to tag installation/attachment gear, the tag provision equipment 206 may provide for separate (from installation/attachment) or directly-to-product type actual manufacturing of a tag by the applicable equipment 208. Alternatively, the tag may be received as substantially ready-made for installation type configuration only by the provision equipment 206.

The tag manufacturing gear 208, optionally thus provided together with or as a part of the provision equipment 206, refers to equipment that is arranged to produce at least part of a tag, such as the chip, and/or other circuit layout advantageously containing the traces defining e.g. antenna(s). Additionally or alternatively, the gear 208 may be adapted to connect the chip, i.e. 'brains' of the tag, to a substrate and related circuit layout and/or to provide additional material layers to the overall tag construction. A skilled person will acknowledge the fact that by the adoption of the actual tag manufacturing gear 208 in the tag provision equipment 206, configuration of tag implementation may be dynamically determined also having regard to the very basic properties of the tag responsive to the product information.

Preferably, the manufacturing gear 208 comprises a printing apparatus for printing, by means of printed electronics, the traces of the circuit layout of the tag on a substrate as discussed hereinbefore. The printed traces may define one or more functional components such as an antenna and electrically connect them to e.g. integrated circuit(s) of the tag, such as the chip containing the memory holding identification information available to compatible external reading devices. Yet, e.g. solder or conductive adhesive may be used locally to connect traces with components. Yet, the manufacturing gear 208 may include lamination equipment, cutting equipment, drilling equipment, shaping equipment (e.g. thermoforming equipment in case the used substrate is of thermoplastic material, for instance) for producing an optimal tag for each particular product item.

Preferably, as described herein earlier the tag provision equipment 206 is indeed configured to at least partially automatically adapt, and thus optimize, the tag implementation based on product information. The product information may refer to technical information such as product material, size, package properties, etc.

Alternatively or additionally, the product information may refer to e.g. product name, other identifier or other information using which technically more meaningful product information (e.g. material data) may be read, requested or otherwise obtained e.g. from a database that may be internal or external to the tag provision equipment 206. The database may contain product information that is addressable with product identifiers.

In some embodiments, the product information may be hosted and/or provided by the management system 102 and originally submitted thereto e.g. by product manufacturers. Still, at least part of the provision equipment 206, such as the part determining a proper tag implementation based on product information, may be in some embodiments implemented in connection with the product information—hosting entity such as the management system 102.

Reverting to the actual optimization of a concerned tag implementation, in the case of a metallic product package (e.g. beverage can), the tag antenna may be determined accordingly to minimize the usually detrimental effect of metallic material in the radiation pattern of an antenna. An inverted F-antenna or patch antenna could be selected for the purpose, for instance, over some other design such as dipole type line antenna.

Additionally or alternatively, further aspects that may be taken into account in automated configuring of the tag implementation include e.g. information available regarding the estimated, known or predicted reader configuration at a number of locations of the supply/value chain. Reader configuration may include at least one element selected from the group consisting of: physical distance from the estimated tag location during reading, maximum or recommended reading distance, material(s) between the reader antenna and tag antenna, properties of material(s) between the reader antenna and tag antenna, transmission properties, transmission power, antenna type (e.g. linear polarization, circular polarization, monostatic or bistatic circular), reception properties, read pattern (e.g. azimuth/elevation), receiver sensitivity, environment temperature, environment pressure, and environment humidity.

In the light of the foregoing, a number of environmental parameters such as pressure, moisture, and/or temperature expected to prevail in a location where the product item is supposed to be located during its journey through the value/supply chain may be catered for while configuring the tag implementation. For example, in high temperatures (considering temperatures exceeding e.g. about 180 degrees Celsius) ordinary solder used for connecting components such as the chip to an antenna structure may begin melting and thus ruin the established electrical/mechanical connection. Accordingly, special high-temperature solder (e.g. Au, AuSn, AuSi, etc.) may be applied instead of e.g. low-temperature melting Indium-based solder.

Processing element 214 of the management system 102 may refer to one or more processors, microprocessors, signal processors, microcontrollers, etc. capable of processing instructions and other data based on program logic 212 stored in the memory 218 that may refer to one or more memory chips, hard discs, memory cards, etc. The memory 218 further hosts a data repository for storing e.g. product information and data received from tag reading equipment 210 and potentially processed further in terms of related analysis results such as statistics.

Data interface 216 refers to one or more wired and/or wireless communications interfaces for transferring data between the system 102 and external entities such as the tag reading equipment 210, user terminals, external control or data systems, etc. Fixed network interface such as Ethernet interface may be provided. Applicable wireless interfaces include e.g. cellular interfaces and wireless LAN interfaces. UI 220 provides user control and data representation features to the users of the system 102. UI 220 may be web-based or web-accessible, or generally Internet-accessible, for instance. The UI 220 may apply data interface 216 for the required data transfer with client devices and systems. It 220 is preferably graphic and enables visual analysis of gathered data and related analysis results.

In terms of hardware the system 102 may be generally realized by means of a number of servers optionally residing in a cloud computing environment, for instance.

Computer software implementing the operation logic 212 may be provided on a non-transitory carrier such as a memory card, optical disc, a hard disc, or other applicable medium.

Figure 3:
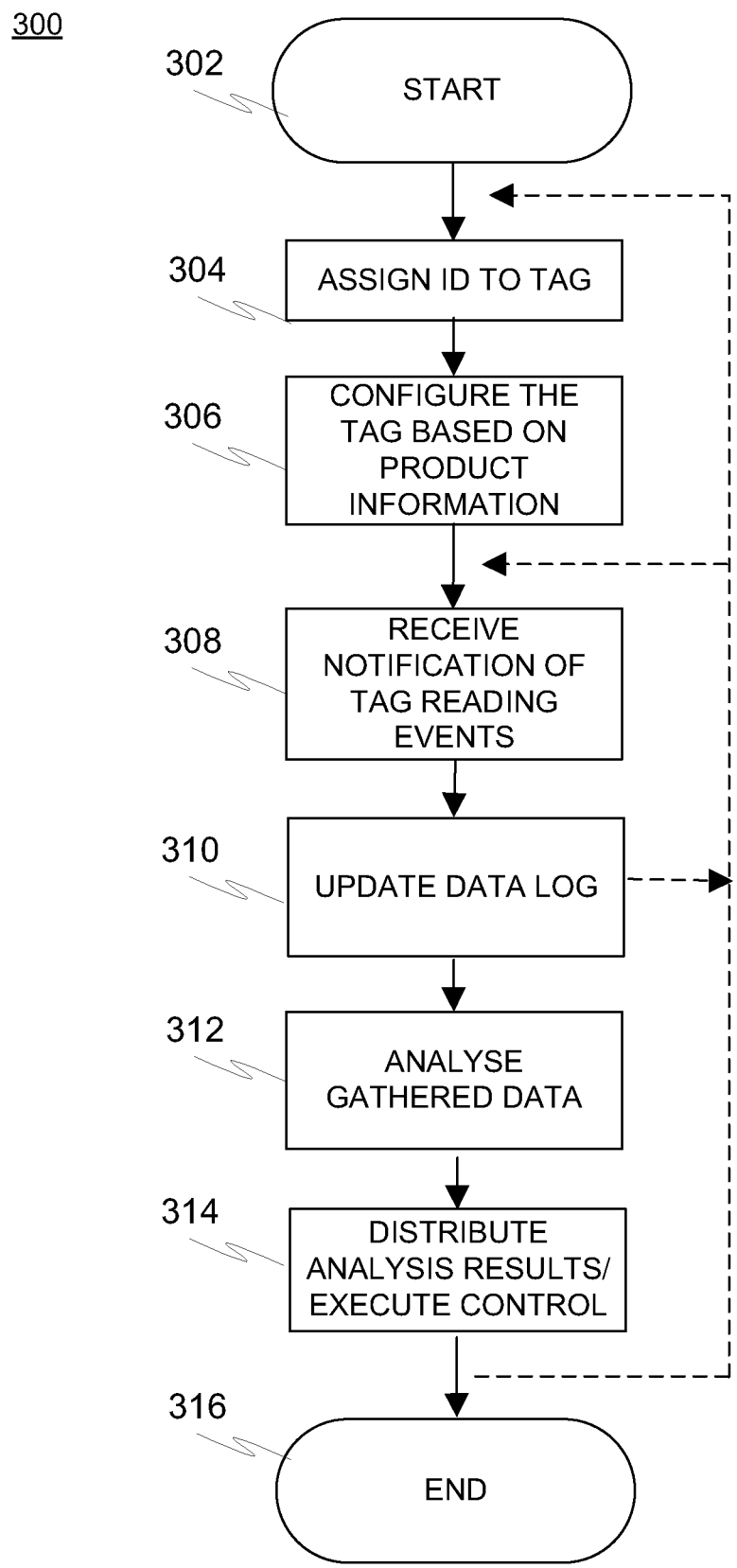
FIG. 3 is a flow diagram disclosing an embodiment of a method in accordance with the present invention.

FIG. 3 is a flow diagram disclosing an embodiment of a method in accordance with the present invention.

At start-up 302, necessary preparatory actions such as acquisition, installation and configuration of tag related equipment and management system related equipment may be performed.

At 304, identification information such as a serial number, manufacturer id, and/or product id (may identify e.g. product type or class), is written/programmed to the tag. This may in practical circumstances take place in several steps or only at once, the latter being the case with e.g. read-only tags. For example, the chip manufacturer may provide the tags (chips) with necessary identification information that can be later read by reading equipment and used for identifying the tag and the associated product item while its journey through the value/supply chain. Additionally, in the case of WORM tags or read-write tags, e.g. the tag manufacturer/installer (e.g. product packer) or subsequent members of the value/supply chain may add to or change the information stored in the tag. In addition to identification information, e.g. data log indicative of actions, concerned parties handling the product item and/or related timestamps may be stored in the tag. Advantageously, the identification information carried by a tag identifies the tag uniquely or at least pseudo-uniquely (to a level considered sufficient in view of supply/value chain monitoring, e.g. uniquely relative to the particular target chain), which also enables identifying the associated product item provided with the tag to a comparable level.

At 306, the tag implementation is configured responsive to the product information and potentially other information, such as reading equipment or environment information, available. The product information may be signalled by a number of parties (product manufacturer, retailer, distributor, etc.) to the tag provision equipment, hosted by e.g. product packer, using a predefined signalling protocol and/or digital data standard. In some embodiments, it may be read from a digital file or e.g. already-existing product packaging as discussed hereinbefore. Responsive to the information, the tag provision equipment optimizes the implementation having regard to a number of features. The tag, or at least portion thereof (e.g. antenna) may be provided to the product item. Correspondingly, the product item may already contain remaining portion of the tag, or it is provided afterwards.

For example, tag reliability may be optimized in view of reading range and/or operation temperature through the optimization of antenna shape/dimension and/or solder material when the used wireless standard applied in the readers (e.g. LF, UHF or SHF/Gigahertz range) and/or temperature whereto the product item is subjected during the supply/value chain is known, respectively. Other performance optimization criteria may include e.g. antenna directivity, radiation pattern shape, noise resistance, impact resistance, pressure resistance, moisture resistance, heat resistance, small size, weight, thickness, etc.

Here, also the product information regarding the product and the tag information preferably comprising at least identification information may be linked at or via the management system, preferably using one or more databases or other feasible data structures or generally repositories, so that subsequent notifications of tag reading events can be automatically also associated with the particular product item carrying the tag notified. Thus, by the tag identification information the data accessible through the management system regarding the associated product item, including e.g. indications of tag reading event notifications and preferably data indicative of e.g. product type, class, package, and/or used material(s)/ingredients, may be advantageously retrieved, supplemented and/or modified.

Items 304, 306 may be executed for several tags and related product items upon need, and/or a new tag may be provided to a product item already previously associated with at least one tag, if necessary, which is highlighted in the flow diagram by the dotted loop-back arrow.

At 308, a notification of a tag reading event including identification information identifying the tag and the associated product item preferably uniquely, and further information elements such as location, identity of the informing party (e.g. logistic company or distributor), action made (e.g. placement in transit), and/or time stamp, is received. The management system may receive the data via the data interface, such as a communications network interface, thereof. The interface may be a wired interface directly or ultimately connecting to the Internet or predefined private network, for instance.

At 310, an indication of the received notification is stored in the data repository of the management system. Typically, an event log associated with the tag and the product item hosting the tag is updated by at least part of the received notification data at this phase.

At 312, the obtained (logged) data is analysed utilizing desired techniques of e.g. big data analytics and/or data mining. Various statistics regarding the overall value/supply chain or a part thereof may be determined as discussed hereinbefore for chain and chain member performance evaluation and optimization. The statistics/analysis may focus on a plurality of product items/tags, or supply/value chains, or just a single product item/tag/chain at a time.

At 314, the analysis results are distributed. Their availability may be subjected to a fee and/or other conditions. The analysis data output may follow a predefined data format, e.g. database format or datasheet format. Scheduled or otherwise triggered (e,g. responsive to a data request) data transfer to devices and systems of interested parties is fully possible.

Instead of or in addition to analysis data distribution, the management system may be itself configured to determine a number of performance-optimizing control actions relating to one or more activities in the associated value/supply chain based on the analysis results.

The control actions may incorporate providing instructive messages such as e-mails or other human-readable messages provided via the system UI for manual reading by predefined management personnel, for example, of the value/supply chain (e.g. manufacturer, distributor, wholesaler, retailer, logistic company, merchandise availability system provider, private label, etc.), and/or instructive commands, or generally signals, sent for automatically adapting the functioning of the receiving system or entity/element functionally connected thereto.

For example, if the analysis implies a certain logistic company causes a bottleneck in the supply/value chain as a retailer's stock is empty or close to empty all the time despite of duly placing the concerned goods on order, and the related distributor or wholesaler continuously has a lot of correct goods in stock, the system may be configured to send a message/command to a predefined target at an intermediate logistic company to manually or automatically increase the capacity for the transit so that the performance is improved an bottleneck removed or at least reduced.

At 316, method execution is ended. The dotted loop-back arrow reflects the likely repetitive nature of the execution of various method items as being easily understood by a person skilled in the art.

The invention claimed is:

1. A system for monitoring the life cycle of a product in open-loop or closed-loop retail environment having regard to the associated supply or value chain, said system comprising:
    tag provision equipment arranged to
        obtain product information, where the product information indicates properties of a product item, and
        configure a wirelessly interrogatable electronic identification tag to the product item for identifying the product item by externally readable identification information carried by the interrogatable electronic identification tag, wherein the externally readable identification information differs from the product information, and further wherein said configuring of the interrogatable electronic identification tag to the product item comprises:
            accessing the product information, reader configuration at a number of locations of the supply or value chain, and/or environmental conditions expected to prevail in at least one location of the supply or value chain, and determining, in automated fashion according to predefined decision logic, at least one technical characteristic to be used in implementation of the interrogatable electronic identification tag based on the accessed information, said tag implementation including properties of the interrogatable electronic identification tag, to optimize the operation of the interrogatable electronic identification tag in connection with said product item utilizing at least one optimization criterion selected from the group consisting of: reading range, antenna directivity, heat resistance, impact resistance, pressure resistance, moisture resistance, noise resistance, small size, low weight, and low thickness, and
            producing or attaching the interrogatable electronic identification tag to the product item in accordance with said at least one technical characteristic, and
    electronic data management system accessible via a communications network, preferably the Internet, comprising a data interface configured to receive and transmit data, and a data repository configured to store indications of received digital notifications of tag reading events in a plurality of activities of the associated supply or value chain, said notifications conveying said tag identification information.

2. The system of claim 1, further comprising identifier allocation equipment arranged to assign at least portion of said identification information to the interrogatable electronic identification tag.

3. The system of claim 1, wherein the product information comprises at least one element selected from the group consisting of: product class or type, material, composition, chemical formula, ingredients, list of ingredients, size, dimensions, shape, shell-life, electrical properties of the product, product package information, product package size, package material, product package dimensions, product package shape, temperature, storage temperature, processing temperature, transport temperature, product package capacity, electrical properties of the package, tray information, blister pack information, mallet information, container information, wrapper information and crate information.

4. The system of claim 1, wherein the at least one technical characteristic of the implementation of the interrogatable electronic identification tag includes at least one element selected from the group consisting of: size, shape, dimensions, location, position, alignment, type, RF (Radio Frequency) technology, RF frequency, antenna, antenna type, antenna shape, antenna size, antenna position relative to the interrogatable electronic identification tag or product item, number of antennas, production technique, transmission power, receiver sensitivity, circuit design, integrated circuit (e.g. microchip) design, material(s), casing, label, substrate, number of layers, printing material (e.g. ink), printing material properties, printing material thickness, protective material, electrical conductivity, capacitance, inductance, resistance, optical transparency, and design of a product package accommodating the product and the interrogatable electronic identification tag, design of a label or other substrate accommodating the interrogatable electronic identification tag.

5. The system of claim 1, wherein received notification includes at least one data element selected from the group consisting of: location, time, date, sender id, and activity indication.

6. The system of claim 1, configured to analyse the data having regard to a plurality of the stored indications of notifications of tag reading events, said analysis covering one or a plurality of interrogatable electronic identification tags and related product items, and based on the analysis, to establish statistical indication of a predefined performance indicator relating to the supply or value chain.

7. The system of claim 1, configured to analyse the data having regard to a plurality of the stored indications of notifications of tag reading events, said analysis incorporating joint analysis covering a plurality of interrogatable electronic identification tags and related product items in multiple supply or value chains of mutually different or similar product items.

8. The system of claim 6, configured to determine, through said analysis, at least one indication characterizing one or more of the analyzed supply or value chains, said at least one indication being selected from the group consisting of: product class or segment, customer segment, location, manufacturing location, sales location, storage location, transport location or route, time, schedule, manufacturing time, dispatch time, transport time, storage time, sales period, customer profile, customer preferences, market area, and product item batch size.

9. The system of claim 6, configured to determine, based on the analysis, a control signal for improving the performance of an associated supply or value chain member according to predefined criterion.

10. The system of claim 1, further comprising tag reading equipment configured to provide notifications of tag reading events to the management system via at least one communications network.

11. The system of claim 1, wherein the tag provision equipment is configured to execute at least one provision action selected from the group consisting of: (a) printing at least part of the interrogatable electronic identification tag directly on the product item optionally on product or product package surface, (b) attaching by adhesive at least part of the interrogatable electronic identification tag on the product item or product package surface, or (c) and attaching at least part of the interrogatable electronic identification tag on the product item where at least part of the interrogatable electronic identification tag electronics have been produced additively by printing conductive material on a carrier substrate.

12. The system of claim 1, wherein the interrogatable electronic identification tag comprises at least one property selected from the group consisting of: RF (radio frequency) spectrum operability, LF, HF, UHF or SHF spectrum operability, passivity or semi-passivity, and read-only or WORM (write once, read many) nature of the interrogatable electronic identification tag.

13. The system of claim 1, wherein the reader configuration to be taken into account in determining the technical characteristic of the implementation of the interrogatable electronic identification tag includes at least one element selected from the group consisting of: physical distance from the estimated tag location during reading, maximum or recommended reading distance, material(s) between the reader antenna and tag antenna, properties of material(s) between the reader antenna and tag antenna, transmission properties, transmission power, antenna type (e.g. linear polarization, circular polarization, monostatic or bistatic circular), reception properties, read pattern (e.g. azimuth/elevation), receiver sensitivity, environment temperature, environment pressure, and environment humidity.

14. The system of claim 1, wherein the environmental conditions include temperature, moisture and/or pressure, expected to prevail in at least one location of the supply or value chain.

15. The system of claim 1, configured to execute or output analysis or statistics based on the stored indications responsive to detecting a fulfilment of predefined condition.

16. The system of claim 1, configured to retrieve product information from a digital file.

17. A method for tracking products having regard to the associated supply or value chain, comprising obtaining product information, by tag provision equipment, where the product information indicates properties of a product item, and configuring, by the tag provision equipment, a wirelessly interrogatable electronic tag to the product item for identifying the product item by externally readable identification information carried by the interrogatable electronic identification tag, wherein the externally readable identification information differs from the product information, and further wherein said configuring of the interrogatable electronic identification tag to the product item comprises:

accessing the product information, reader configuration at a number of locations of the supply or value chain, and/or environmental conditions expected to prevail in at least one location of the supply or value chain, and determining, in automated fashion according to predefined decision logic, at least one technical characteristic to be used in implementation of the interrogatable electronic identification tag, said tag implementation including properties of the interrogatable electronic identification tag based on the accessed information, said tag implementation including properties of the interrogatable electronic identification tag, to optimize the operation of the interrogatable electronic identification tag in connection with said product item utilizing at least one optimization criterion selected from the group consisting of: reading range, antenna directivity, heat resistance, impact resistance, pressure resistance, moisture resistance, noise resistance, small size, low weight, and low thickness, producing or attaching the interrogatable electronic identification tag to the product item in accordance with said at least one technical characteristic, and storing, at an electronic data management system accessible via a communications network, indications of digital notifications of tag reading events in a plurality of activities of the associated supply or value chain, said notifications indicating said tag identification information.

18. The method of claim 17, wherein the indications are stored as associated with other information describing the product item the interrogatable electronic identification tag has been provided to.

19. The method of claim 17, wherein product information is read from a digital file, received via a communications connection, or read preferably optically or electromagnetically from the product item, optionally from the package or packaging material thereof.

20. The system of claim 1, wherein the product item properties are at least one of shape, dimensions, material, storage temperature, or electrical properties.

* * * * *